United States Patent

[11] 3,572,022

[72] Inventor Charles A. Smith
 New Holland, Pa.
[21] Appl. No. 846,664
[22] Filed Aug. 1, 1969
[45] Patented Mar. 23, 1971
[73] Assignee Sperry Rand Corporation
 New Holland, Pa.

[54] BALER PICKUP HEIGHT ADJUSTING MECHANISM CAPABLE OF REMOTE ACTUATION
 7 Claims, 5 Drawing Figs.
[52] U.S. Cl................................................. 56/341,
 56/364
[51] Int. Cl.............................................. A01f 15/04
[50] Field of Search......................................... 74/535;
 56/341, 342, 343, 344, 364; 100/179—189

[56] References Cited
 UNITED STATES PATENTS
 2,581,542 1/1952 Kolzing.......................... 56/343
 2,634,573 4/1953 Carroll........................... 56/341X
 2,826,933 3/1958 Schumacher.................. 74/535
 2,981,046 4/1961 Hollyday et al............... 56/341

*Primary Examiner*—Russell R. Kinsey
*Attorneys*—Joseph A. Brown, John C. Thompson, James J. Kennedy and George C. Bower ABSTRACT: A height adjusting mechanism on the side of a baler has a link connected between a bracket rigidly attached to the rotatable baler pickup support and a lever pivotally mounted on the baler. The lever has a toggle pivotally mounted at the opposite end of the lever from the pivot. The toggle has a pawl engageable with a ratchet rack curved about the lever pivot and a stop engaging the lever to move the lever opposite to the ratchet rack for raising the pickup and permitting the lever to swing back to the pickup in the lowest position or intermediately engaging the pawl with the ratchet rack for intermediately positioning the pickup. The toggle may be remotely operated by a cable. A lost motion slot is provided between the link and bracket and a spring between the link and lever permits the lever to be set at positions beyond the lost motion slot when the pickup is otherwise held to preset the pickup height.

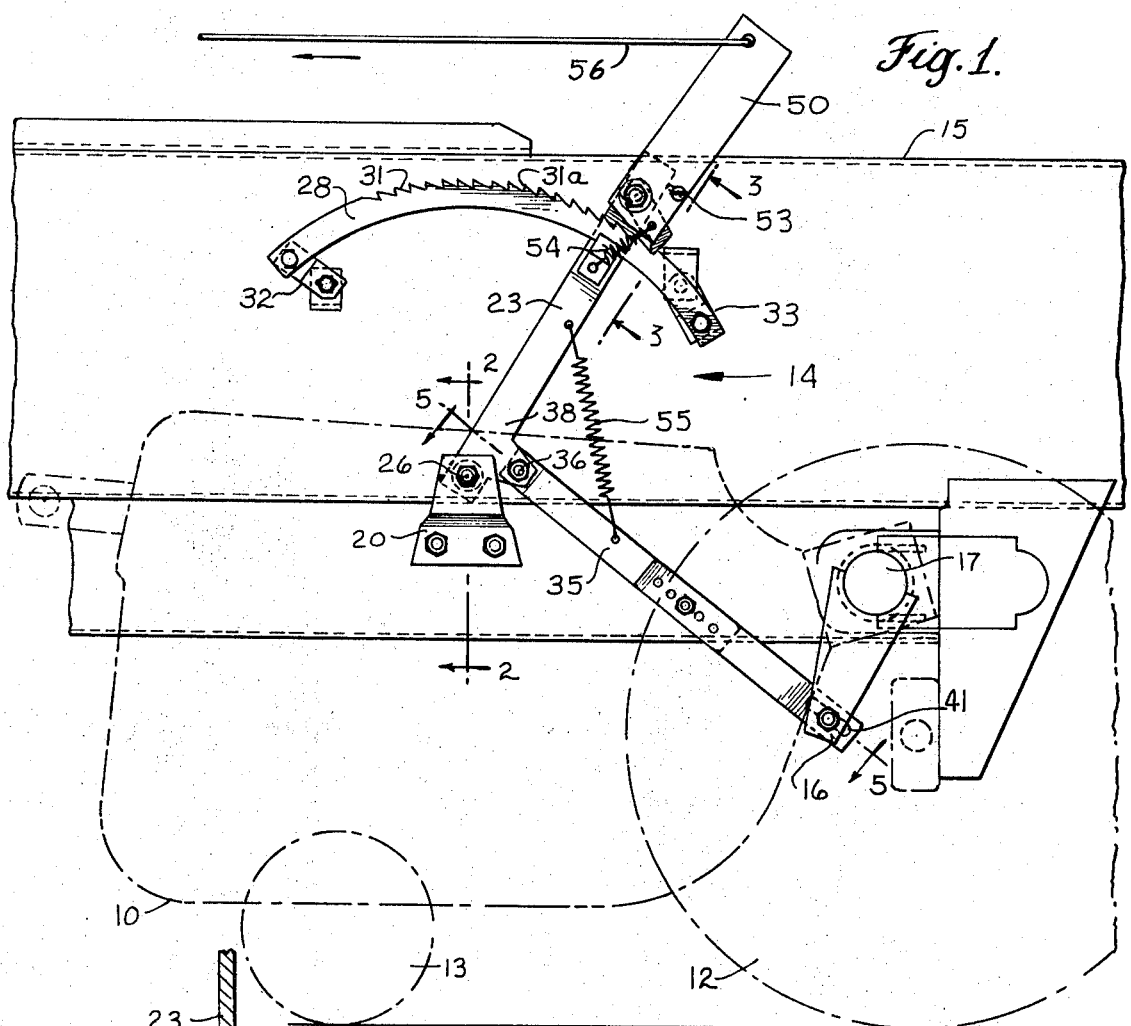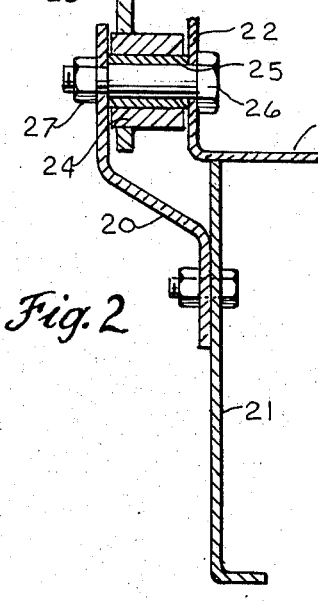

INVENTOR:
CHARLES A. SMITH

BALER PICKUP HEIGHT ADJUSTING MECHANISM CAPABLE OF REMOTE ACTUATION

BACKGROUND OF THE INVENTION

This invention relates to a remotely operated adjusting mechanism for manually setting an operating device to or from a given position over a range of positions and is directed particularly to setting the height of a pickup adjustably mounted on a baler by a mechanism manually operated remotely from a tractor.

In hay balers the bale case extends longitudinally and a feeder extends transversely from one side of the bale case at an intermediate point to supply hay in front of the bale case plunger forming the bale. Wheels are provided at the outer end of the feeder and at the outer side of the bale case for supporting the baler and permitting it to be pulled by a tractor in the longitudinal direction of the bale case. Downwardly and forwardly of the feeder a pickup unit sweeps the hay from the ground and deposits it in the feeder for rapid delivery to the bale case.

The pickup unit is adjustably mounted on the frame of the baler for setting the pickup unit in a raised transport position or in hay gathering position. As a part of the frame a casing with a ground engaging wheel supports the pickup unit at the outer end opposite from the bale case. One method is to pivotally support the pickup unit on a shaft rotatably mounted in the feeder and the bale case. The shaft extends underneath the bale case to the outer side and has a bracket for rotating the shaft to raise and lower the pickup unit.

The disadvantages of this is the variations in the level of the ground and the height of the cut and the remoteness of the setting of the pickup unit from the tractor causes the pickup unit to be operated at a position which is often not the best for proper removal of the hay from the ground. It is, therefore, desirable and the purpose of this invention to provide a pickup unit height adjusting mechanism that permits the tractor operator to raise and lower the pickup unit and set it over a range of positions from the tractor while moving across the field baling hay.

OBJECTS AND SUMMARY OF THE INVENTION

An object of this invention is to provide an adjusting mechanism for remote setting at any desired position over a range of positions or vary the mechanism over the range without setting at any position.

Another object of this invention is to provide an adjusting mechanism that permits the tractor operator to manually adjust the height of baler pickup from the tractor during the baling operation.

Another object of this invention is to provide a remotely controlled baler pickup height adjusting mechanism that is inexpensive and made from a few standard parts.

In summary this invention constitutes an adjusting mechanism with a lever pivotally mounted at the center of curvature of an arcuate ratchet with a pawl and stop bearing toggle pivotally mounted on the lever and spring biased to engage the pawl with the ratchet in one direction and to rotate in the opposite direction with the stop engaging the lever for varying the lever in both directions without engaging the ratchet or engaging the ratchet at any desired position.

These and other objects and advantages of this invention will be apparent from the following description and claims taken in connection with the accompanying drawing which illustrates the various features of this invention.

BRIEF DESCRIPTION OF THE DRAWINGS

FIG. 1 is a side elevational view of the baler and adjusting mechanism on the outer side of the bale case with the pickup unit in the lowest hay gathering position.

FIG. 2 is an enlarged cross-sectional view taken along line 2-2 of FIG. 1.

FIG. 3 is an enlarged cross-sectional view taken along 3-3 of FIG. 1.

DETAILED DESCRIPTION OF THE PREFERRED EMBODIMENT

Figure 4:
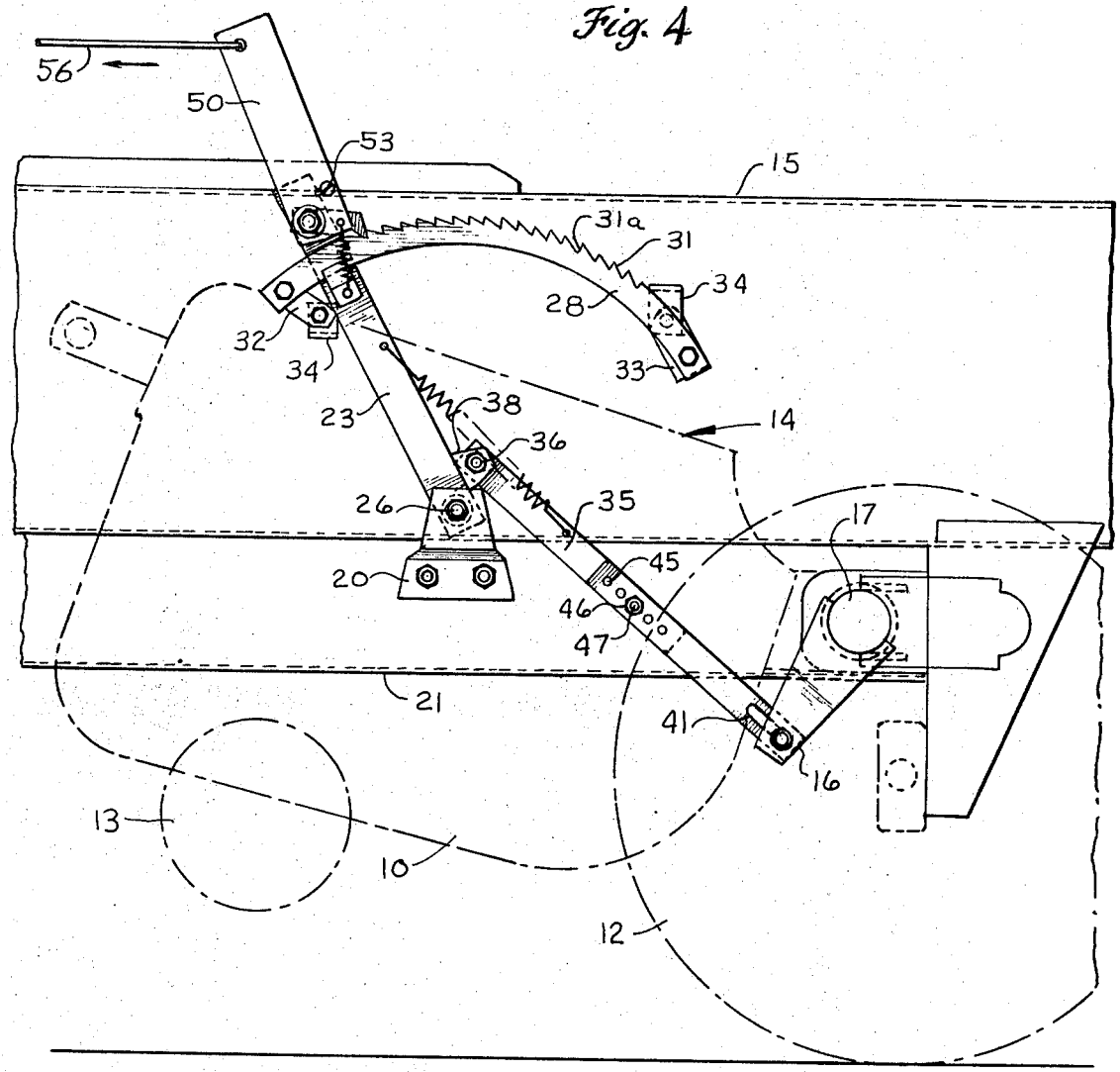
FIG. 4 is a side elevational view of the baler and adjusting mechanism on the outer side of the bale case with the pickup unit in the raised transport position.

Referring to FIGS. 1 and 4 the pickup unit 10 is pivotally supported on the baler mounted on wheels 12. The height of the pickup unit 10 is controlled primarily by the adjusting mechanism 14. The wheel 13 on the pickup unit 10 may or may not engage the ground and set the height of the pickup unit as later described herein. In FIG. 4 the pickup unit 10 is in the extreme raised transport position. The position of the pickup unit 10 is controlled by the height adjusting mechanism 14 mounted on the left side of the bale case 15. The height adjusting mechanism is connected to the bracket 16 extending perpendicular to and rigidly fastened to the transverse tubular shaft 17 fixedly connected to the tube (not shown) pivotally supporting the pickup unit 10.

A bracket 20 (FIG. 2) is bolted to the side member 21 extending downward from the bale case 15 and angles outwardly in spaced relation to the sidewall 22 of the bale case. The lever 23 has a collar 24 pivotally mounted between the bracket 20 and the sidewall 22 on a bushing 25 supported by a bolt 26 extending through the sidewall and the bracket and fastened by a nut 27.

The lever 23 extends upwardly above a ratchet rack 28 with teeth 31 having pawl engaging surfaces 31a facing forwardly. The rack is curved with pivot pin 26 being the center of curvature. The rack is supported at the ends by brackets 32, 33 spacing the rack from the sidewall 22 of the bale case. The lever is positioned between the sidewall and the rack. The braces 34 fastened to the sidewall with the brackets 32, 33 support the shielding (not shown) enclosing the knotter and twister drives (not shown).

Figure 5:
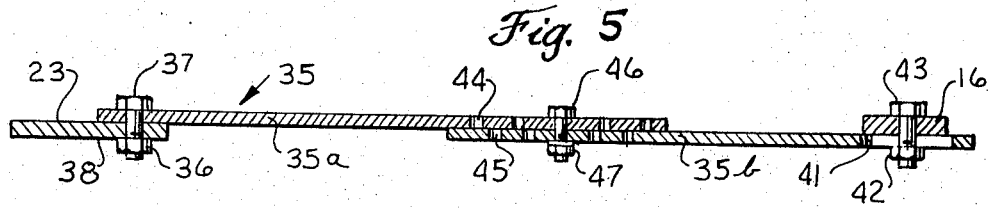
FIG. 5 is an enlarged cross-sectional view taken along line 5-5 of FIG. 1.

A link 35 is pivotally connected to the lever 23 by the nut 36 and bolt 37 (FIG. 5) passing through the projection 38 on the lever adjacent the lower end thereof. The other end of the link 35 has a longitudinal slot 41 and is slidably connected to the bracket 16 by the nut 42 and bolt 43 (FIG. 5). This provides a lost motion action between the pickup unit support and the adjusting mechanism to permit movement of the pickup unit within a given setting. The link 35 is adjustable in length and formed into two parts 35a, 35b with sets of holes 44 and 45, respectively, to receive the bolt 46 fastened in place by nut 47. The link 35 is adjustable to allow for machine tolerances and to provide freedom for positioning lever 23 relative to the arc of the rack 28. The bolt 46 may also function as an overload safety device.

At the upper end of the lever 23 a toggle 50 is pivotally mounted by the bolt 52 and 52a on the upper end of lever 23 and extends generally in the same direction as the lever (FIG. 3). A pawl 51 is mounted at the lower end of the toggle in fixed relation to the bolt 52 and pin 57. The pawl extends rearwardly to engage the forwardly facing pawl engaging surfaces 31a. The lever 23 is held against the rack 28 by guide 58 secured by the bolt 59 and nuts 60, 61 or by welding. The toggle 50 has a pin 53 adjustably mounted in the toggle for forming a stop limiting the forward rotational movement of the toggle independent of the lever 23. The pin 53 engages the edge of the lever 23 and rotates the lever on the forward movement of the toggle. This action lifts the pawl from the teeth 31 as the toggle and lever move forwardly. This forward movement lifts the pickup unit 10 and the weight of the pickup unit is transmitted through the bracket 16, link 35 and lever 23. On the lowering of the pickup unit the weight of the pickup unit holds the lever 23 in engagement with the pin 53 and the pawl out of engagement with the teeth 31. On release of the toggle 50 the spring 54, connected between the lever 23 and the bolt 57 on the toggle 50, rotates the toggle so that the pawl engages the teeth 31 to set the position of the pickup unit.

A helical spring 55 is connected between the lever 23 and the link 35 to bias the lever 23 towards the bracket 16. The spring provides a substantially constant biasing force over the range of movement of the lever 23 since the spring is stretched under tension. If the pickup unit 10 is resting on raised ground the lever 23 may be set at a lower position for the pickup unit under the pull of the spring 55. The pawl 51 will be held against the positioning tooth of the rack 28. The spring 55 permits the lever 23 to be preset beyond the limits of the slot 41 when the pickup unit is being held by means (not shown) in the transport position or by the wheel 13 setting on the ground at a different level from the position of the pawl.

It is thus seen from the foregoing description that a rope or cable 56 may be attached to the upper end of the toggle and a tractor operator vary the height of the pickup by pulling forward on the cable or gradually releasing the cable rearward to lower the pickup unit. A quick release in a forward position of the toggle will result in the toggle being quickly rotated rearward and the pawl engaging the rack at that position of the lever. Thus the pickup unit may be raised and lowered through a full range of positions or set at any position from the drawing tractor. As the operator moves across a field he may adjust the pickup to changes in contour of the ground or in conditions of the crop.

It is readily apparent that the height adjusting mechanism is made of inexpensive and easily fabricated parts and is readily mounted on a baler.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

I claim:

1. On a wheeled baler with a longitudinal bale case, a transversely extending feeder, wheels movably supporting the baler, a pickup extending along said feeder for delivering cut crops thereto, means for raising and lowering the pickup; a linkage means having a lever pivotally mounted on said baler, a link pivotally connected to said lever and to said means for raising and lowering said pickup, means for retaining said lever in selected positions, means pivotally mounted on said lever engaging said retaining means in the selected positions including means for engaging said lever for moving said lever over the range of selected positions to raise and lower said pickup and springlike means resiliently intercoupling said link and lever to permit presetting said linkage means at a selected height setting other than the position of said pickup.

2. On a baler as set forth in claim 1 wherein said means for setting said lever in selected positions is a ratchet rack and said means for engaging said retaining means is spring-loaded pawl.

3. On a baler as set forth in claim 1 wherein said means for setting said lever is a ratchet rack and said means pivotally mounted on said lever is a toggle and said means for engaging said retaining means is a pawl fixed on said toggle with a spring urging said pawl into engagement with said ratchet rack.

4. On a wheeled baler as set forth in claim 1 wherein said link is pivotally connected to said means for raising and lowering said pickup is a lost motion connection.

5. On a wheeled baler with a longitudinally extending bale case, a transversely extending feeder, wheels movably supporting the baler, a pickup extending transversely in front of said feeder, a shaft rotatably mounted on said feeder and bale case with the pickup rigidly attached thereto for pivotally raising and lowering the pickup and a bracket extending from the shaft on the opposite side of said bale case from said feeder; a linkage and ratchet means mounted on the outboard side of said bale case from said feeder and comprising an arcuate, generally longitudinally extending ratchet rack having a plurality of teeth, a lever with means for pivotally supporting said lever below said ratchet rack at the center of curvature of said ratchet rack, a link pivotally connected to said lever and to said bracket on said shaft, a toggle pivotally mounted on said lever above said ratchet rack with a pawl on said toggle for engaging said ratchet rack when rotated towards said teeth and means for engaging said lever on rotation from said teeth, spring means urging said pawl into engagement with said teeth of said ratchet rack, springlike means connected to said link and to said lever to bias said lever into pawl engaging positions and preset said lever at selected height settings other than the position of said pickup.

6. On a wheeled baler as set forth in claim 4 wherein said link and bracket are connected by a lost motion means to permit variations in height of said pickup from the selective height.

7. On a machine having a member movable in relation to the remainder of the machine, lever means pivotally connected to said machine; link means pivotally connected to said lever means and said member for moving said member through a range of positions; a retaining means on said machine; toggle means pivotally connected to said lever means and having means engaging said retaining means over a range of positions corresponding to said member positions, means engaging said lever means on pivoting of said retaining engaging means from a retaining position to move said lever means, link means and said member over a range of positions and spring means interconnecting said link means and said lever means to bias said lever means to a retained position other than the corresponding position of said member.